United States Patent

[11] 3,596,268

[72] Inventor Ernest Howbrook
Cheadle Hulme, England
[21] Appl. No. 800,055
[22] Filed Feb. 18, 1969
[45] Patented July 27, 1971
[73] Assignee National Research Development Corporation
[32] Priority Feb. 22, 1968
[33] Great Britain
[31] 8557/68

[54] PHASE TO DIGIT OR DIGIT TO PHASE CONVERTER
10 Claims, 6 Drawing Figs.

[52] U.S. Cl. 340/347 AD, 340/347 DA, 323/121, 324/83 D
[51] Int. Cl. H03k 13/02
[50] Field of Search 323/121—129, 101, 102, 105, 108; 324/83; 321/52—58; 325/346, 423; 328/155; 329/122, 137; 340/347

[56] References Cited
UNITED STATES PATENTS 3,201,778 8/1965 Porter et al. 340/347
3,323,053 5/1967 Southern 323/101 X

*Primary Examiner*—Maynard R. Wilbur
*Assistant Examiner*—Charles D. Miller
*Attorney*—Cushman, Darby and Cushman

ABSTRACT: A digit to phase converter comprising a binary input word, means for storing the bits of the word in a store, a decoder for the bits to translate them into one or more markings on output wires, a phase divider connected to some of the output wires to translate the marking thereon into a voltage of a selected phase step, and a phase shifter connected to the output of the divider to shift the said output phase by a smaller amount than each phase step.

The invention can also be embodied in a converter operating to translate an input phase voltage into a binary code by comparing the input voltage in a phase discriminator with a variable reference phase voltage derived from a fixed phase voltage, varying the variable phase voltage by means of a stepped phase divider and phase shifter till the input and reference phases coincide, registering the phase divider and phase shifter steps in a counter, encoding the counter position, and storing the binary result until required to transmission or recorded.

PHASE TO DIGIT OR DIGIT TO PHASE CONVERTER

Prior Application:

In Great Britain on 22nd Feb. 1968 and numbered 8557/68.

My invention relates to phase-to-digit or digit-to-phase converters, and has for its object the provision of a converter capable of a high degree of accuracy whilst using apparatus of known form.

In the case particularly of a digit-controlled mechanism, or a device to move a machine part in accordance with digital information derived from a tape or other information channel, it may be necessary to produce an alternating voltage whose phase differs by a predetermined amount from the phase of a reference alternating voltage. Hitherto such means have been of a rather complex character, and my invention aims to simplify such means.

Reference should now be made to the accompanying drawings, in which.

Figure 1:
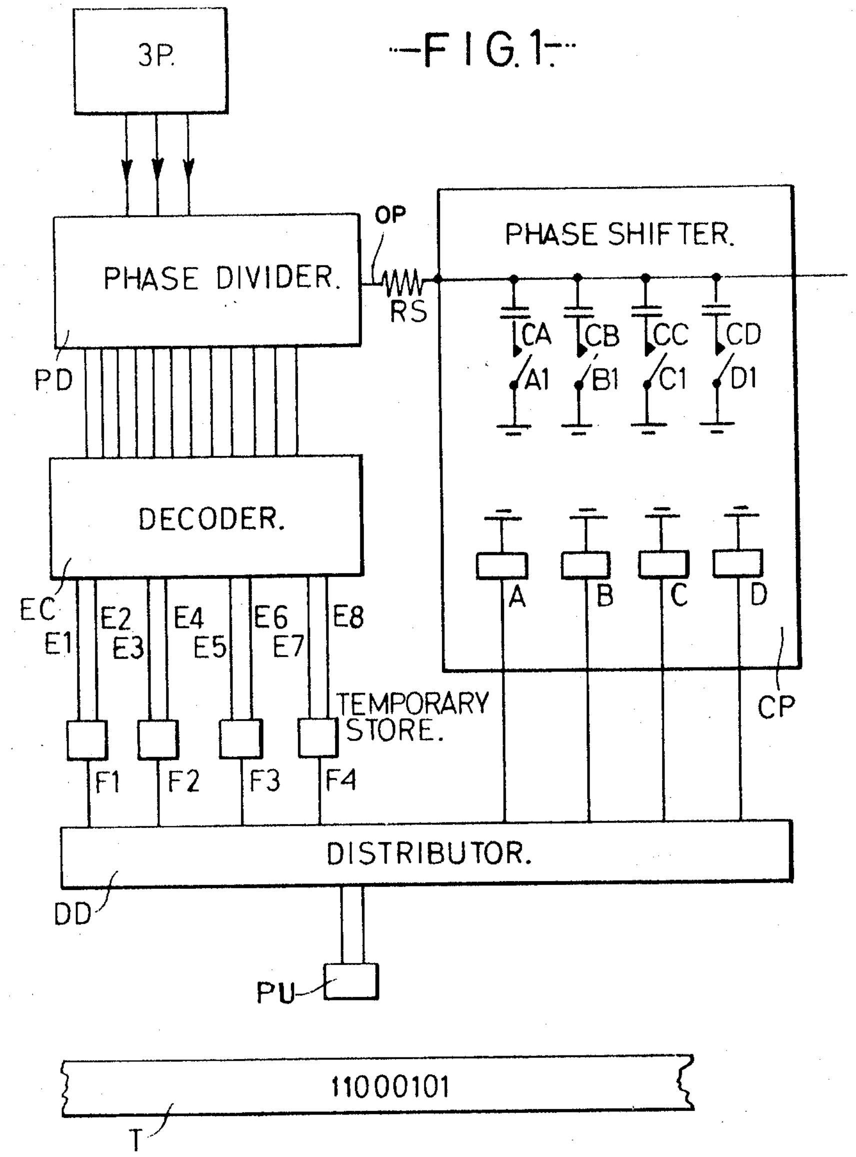
FIG. 1 shows a block schematic of a digit-to-phase converter.

Referring now to FIG. 1, an input reference voltage frequency generator 3P of high stability is fed into a phase divider PD. This can be of any required type such as for example a multiphase transformer with or without resistance networks between the phases, and providing voltage waves differing in phase by 30°. Thus 12 voltages will be available in the phase divider each differing from the preceding and succeeding voltage by 30°, though other phase divisions may be used if required.

The digital information, shown in the figure as being on a binary basis, is picked up by a reader PU from a tape T or other transmission channel, and fed via a distributor DD to the individual units of a temporary store F1—F4, A—D, and the first section of the store F1—F4 is connected to a decoder EC, the latter actuating one of the leads 1—12 between the decoder and the phaser divider in dependence on which combination of the units of the store are energized, the particular lead selecting a phase voltage. This output voltage is applied to an output phase lead OP and a resistor, and the remaining units of the temporary store are connected to a capacity phase shifter CP, such that each unit of the store energized connects a capacitor CA—CD to the output phase lead. The units may be relays A—D, with contacts A1—D1. The capacitors are of such sizes as to produce each one a phase shift one-half of that of the preceding capacitor, and the number of capacitors provided is determined by the degree of accuracy of the resulting output phase shift required. For example, if 12 voltages are available from the phase divider, separated by 30°, then eight capacitors each one-half of the value of the preceding capacitor will give a large number of shifts of output phase. Only four are shown.

The output voltage is maintained for any required time after a pickup of a code of digits; if the tape is moved continuously past the pickup, then the next group of digits may be the same as the first, or may vary. In the latter case, the temporary store is reset, and the phase of the output voltage changes accordingly.

Such a device can be used to control for example a phase sensitive motor computers, servo in dependence upon a series of information words picked up from the tape or other information channel.

The distributor DD (FIG. 1) is of known type such as is used in computers, and the pickup PU is adapted to pick up not only the binary signals shown, but may also pick up clock pulses from the tape. The clock pulses shift an open channel along the distributor step by step, and the binary signals picked up by the pickup are passed through the opened channels in sequence to set one or more of the temporary stores F1 to F4 and A to D. These stores may be relays, or they may be bistable or flip-flop circuits. In connection with the stores F1 to F4, these have outlet leads E1 to E8. Each temporary store unit is so made that an output potential exists either on E1 or E2, or on E3 or E4, or on E5 or E6, or on E7 or E8. Thus there are four such potentials always supplied from the store to the decoder, the coding of the potentials representing the particular lead 1 to 12 which is to be used to select a given frequency phase (see later). Any one or more units of the store, or any one or more of the relays A to D, can be active simultaneously.

Figure 3:
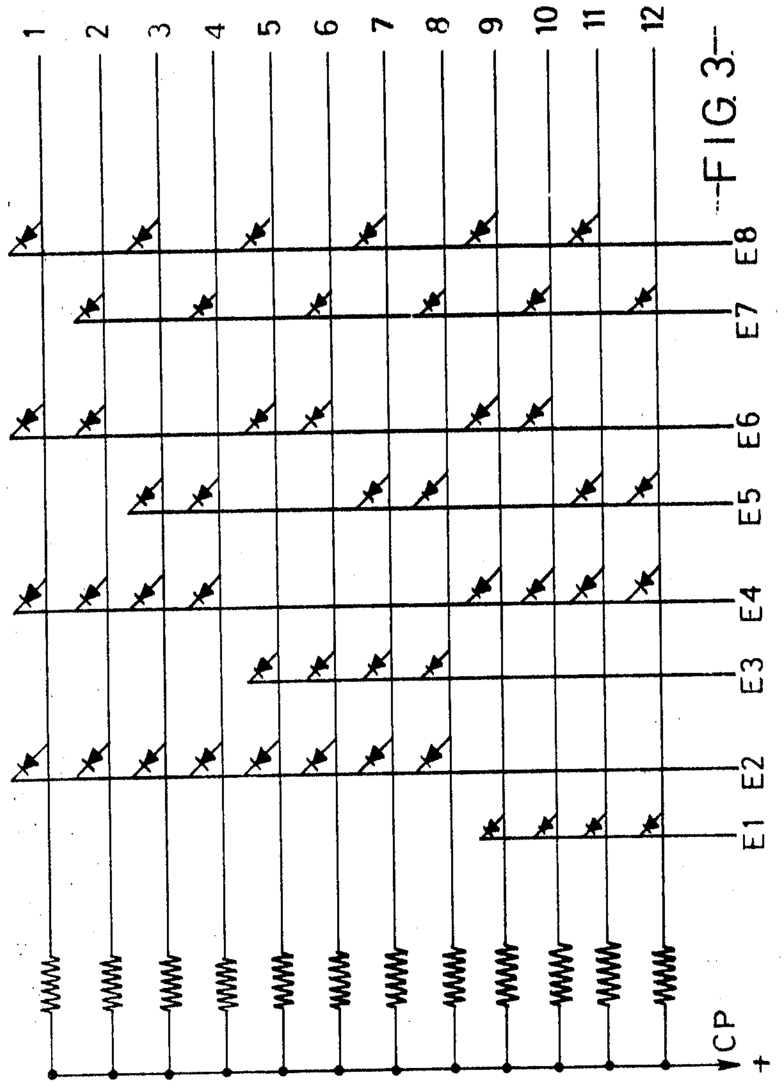
FIG. 3 shows details of the decoder of FIG. 1.

Referring to FIG. 3, it will be seen that a common positive lead CP is connected to 12 resistors, and each of these resistors has a lead connected to combinations of rectifiers extending between the input leads E1 to E8 and the output leads 1 to 12. These designations correspond to the designations in FIG. 1. Thus it will be seen that if earths are placed on E1, E3, E5 and E7, the only lead which is not shorted to earth through its rectifiers is lead 1. Thus with all flip-flops in the F1 to F4 groups, in a reset position, the lead 1 is energized. Similarly, the earths placed on E1, E4, E5 and E8, a signal appears on lead 6. Combinations of earths on the various leads E1 to E8 can produce a positive potential on one only of the leads 1 to 12.

Figure 2:
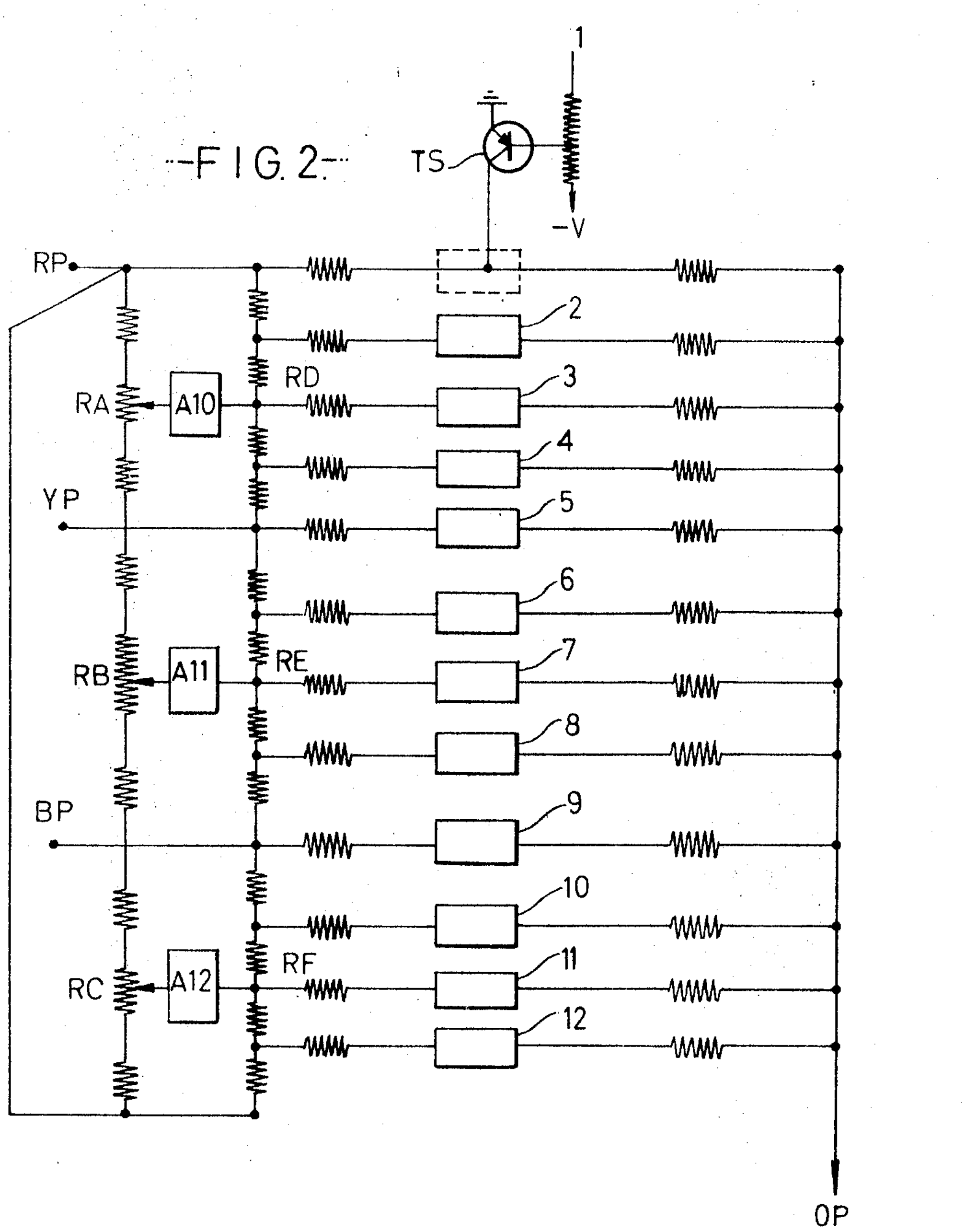
FIG. 2 shows a 3 to 12 phase conversion circuit.

Referring now to FIG. 2 this gives details of the 30° phase divider PD. Three leads RP, YP and BP are connected to a three-phase generator of high stability and accuracy. Such a generator is shown in British Pat. No. 1029595. A resistance potentiometer RA, RB or RC is connected between each pair of phase leads, and an adjustable center point thereof is taken through an amplifier A10, A11 or A12 to a further resistor network RD, RE or RF. Each of these networks consists of four resistors, and it will be obvious that if the amplification factor of the amplifiers is suitably chosen, four equal outputs are derived from each network RD, RE or RF, the outputs differing in phase from one another by 30°. These network outputs are each connected to a transistor switch similar to that shown in connection with lead R. This transistor switch TS has a potentiometer connected to its base, and one end of the potentiometer goes to negative potential and the other labeled 1 in the drawing, to one of the leads 1 to 12 in FIG. 3. When no potential exists on this lead, the transistor acts as a short circuit, so that no voltage from the network RD passes it. When a positive potential is applied to lead 1, the transistor becomes nonconducting, and current, in this particular case from lead R, passes to the output lead OP. If however the transistor switch associated with the second branch of the network had been opened by application of potential to lead 2, then a current of 30° phase shift with respect to lead R is emitted to the output lead OP. Similarly application of potential to any one of leads 3 to 12 opens the transistor switch to which it is connected, allowing current of the chosen phase to be emitted to the lead OP. Other types of switching circuits may of course be used.

Reverting now to FIG. 1, it will be seen that a voltage of a particular phase, the phase being in steps of 30°, is derived on lead CR when a suitable signal has been picked up from the tape T. In order to get a closer adjustment of phase, resistor RS is inserted in the lead, OP, together with a plurality of capacitors Ca to CD, connectable in parallel. Resistance RS plus one or more of the capacitors CA to CD form a phase retarding network of known type, and the amount of retard is determined by which combination of relays A to D is operated. Thus capacitor CA has twice the capacitance of CB, CB has twice the capacitance of CC, and CC twice the capacitance of CD. Thus a phase change of 16 steps can be secured by operating one or more of the relays A to D, with consequent closure of one or more of the contacts A1 to D1.

The selected output phase remains on the output lead of the device until a further word is picked up from the tape by the pickup PU, this second word operating a different combination of units in the temporary store so as to provide a different 30° phase selection from the divider PD, or a different phase retard from the capacitors CA to CD or both.

Figure 4:
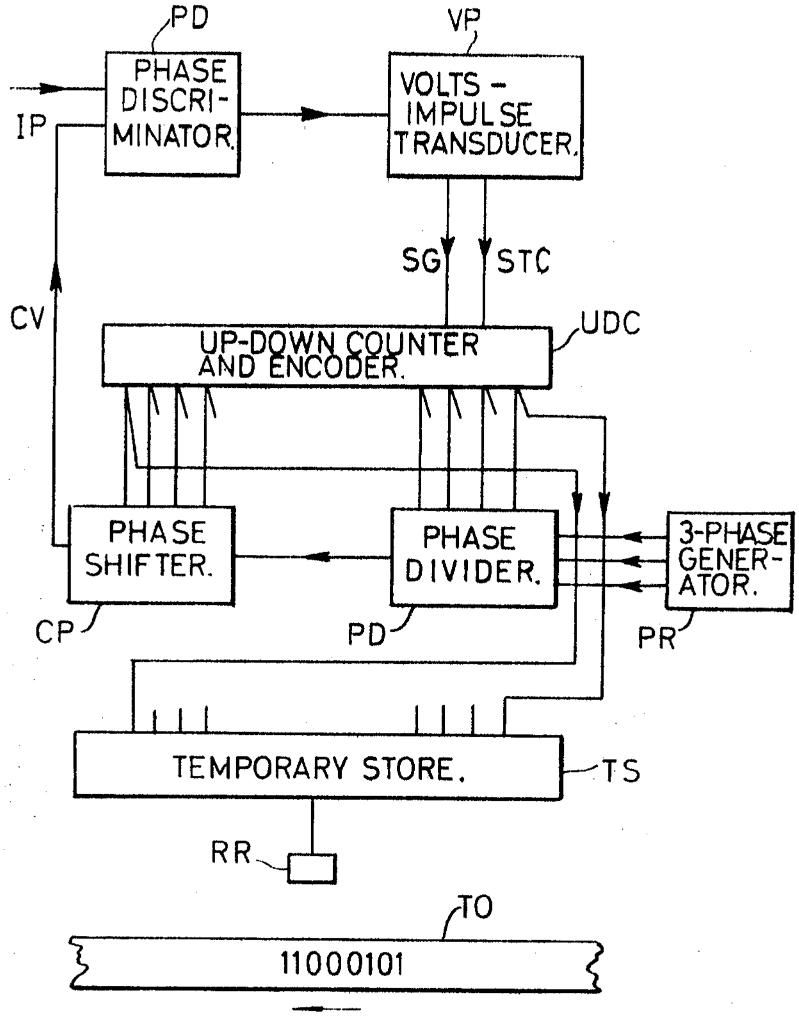
FIG. 4 shows a block schematic of a phase-to-digit converter.

FIG. 4 shows a device for the reverse operation. An input voltage of required phase IP is fed to a phase discriminator PD which also receives an output comparison voltage CV of variable phase derived from a 3-phase alternating voltage reference source PR of constant frequency which may be the same frequency as that used in FIG. 1, or different. This voltage is applied to a phase divider PD and capacitor phase shifter CP of the kind described above in connection with FIG. 1.

If a difference exists between the controlled input voltage phase IP and the reference voltage CV from the capacitor shifter, a signal is generated by the discriminator PD and actuates a volts to pulse transducer VP which produces a positive or negative voltage and pulses depending on whether the input phase is in advance or retard of the reference phase IP. The output pulses of the transducer VP proceed to step a counter and encoder UDC up or down. The output of the counter, which is of known type, switches sections of the phase divider PD and capacitor shifter CP in and out in the manner described in connection with FIG. 1 until the output phase voltage CV of the capacitor shifter coincides with the phase of the controlled input signal IP, when counting stops.

The counter produces a binary output word indicative of the units of the store actuated. The bits of the word may as shown be conveyed to a temporary store TS, from which it may be recorded on a tape, or transmitted over a radio link or line. The process may be repeated as often as desired.

Figure 5:
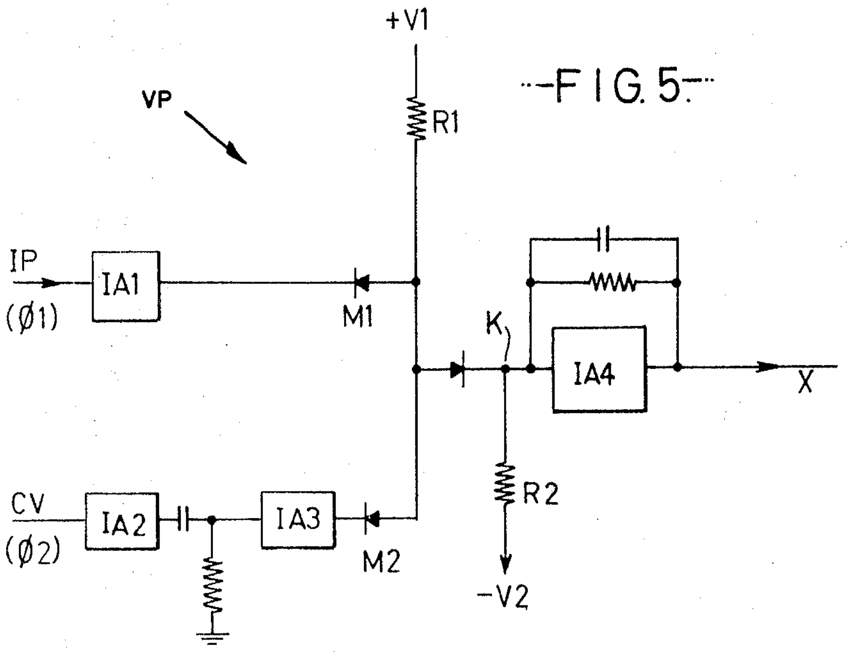
FIG. 5 shows details of a phase discriminator.

FIG. 5 shows details of the phase discriminator PD. The input IP, which is a sine wave, is connected to amplifier IA1 and the input CV, which is also a sine wave, is connected to amplifier IA2. Both amplifiers IA1 and IA2 convert their sine input waves to square waves, and it is assumed that the phase angles of IP and CV are $\Phi 1$ and $\Phi 2$ respectively. The output of IA2 is differentiated by the capacitor-resistor network shown, into a pulse, and the pulses are amplified by IA3. When both the outputs of IA1 and IA3 are positive, then the two diodes M1 and M2 are both blocked, and a current passes from +V1 through R1 of a value $I1=V1/R1$, the current traversing the rectifier M3 to a virtual earth K. When one or both voltages from IA1 to IA3 are negative, no current passes through rectifier M3. However current does pass through R2 to point K from −V2 all the time, this current I2 being equal to −V2/R2. It follows therefore that if the input current to the amplifier IA4 is zero, then $I1+I2=0$. Now the on-time per cycle for I1 is R1/R2 providing −V1 is equal to +V2, and R1 is less than R2, and the output of amplifier IA4 is zero. Expressed in terms of the phase angle, the phase-on angle for IA4 is R1/R2×360°.

For inputs $\Phi 1$ and $\Phi 2$ to give zero output $$(\Phi 1-\Phi 2)=R1/R2\times 360° \quad (1)$$

When $(\Phi 1-\Phi 2)=0$, the output is $$R3/R2\times V1 \quad (2)$$

This gives the discriminator gain in volts/degree as $$R3/R1\times V/360° \quad (3)$$

Thus it will be seen that the output of amplifier IA4 is proportional to the phase difference between IP and CV, and this proportionality can be made very large by increasing the ratio $R3/R1$, and by keeping V1 and V2 as high as is reasonably possible. The voltage at the output point X can range between 0 and a value determined by the phase difference, positive or negative.

Figure 6:
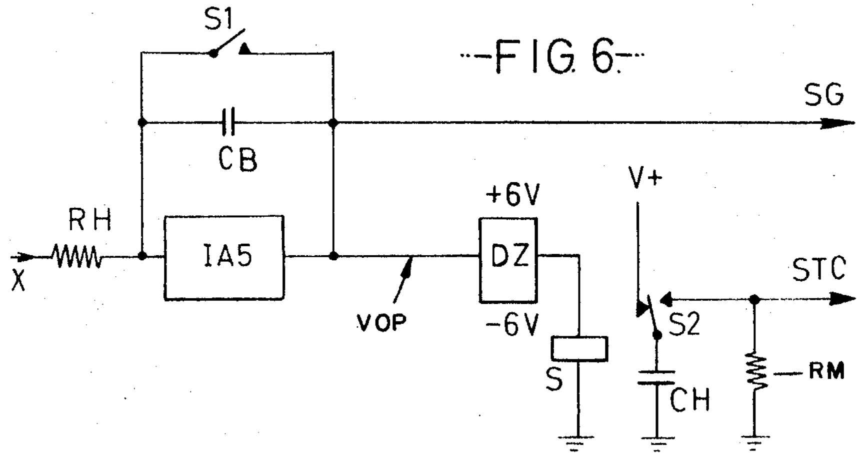
FIG. 6 shows a volts to pulse converter.

The output of the phase discriminator PD is taken on lead X to the input of the pulsing circuit VP FIG. 6. Here it passes through input resistor RH to amplifier IA5 which has a storage capacitor in parallel with it, together with a contact S1 of relay S. Here a small rising DC voltage into the amplifier IA5 causes a steadily increasing output voltage VOP. When this voltage is between say plus 6 volts and minus 6 volts, no current passes through a blocking circuit DZ connected to earth via a relay coil S. The blocking circuit is of known type, containing rectifiers such as Zener diodes. When VOP exceeds ±6 volts, current passes through the relay and operates it.

Contact S1 closes, discharges capacitor CB and short circuits amplifier IA5. Current is therefore cut off from relay S, which releases after a short interval. In the meantime, contact S2 changes over from a connection to a positive voltage supply and applies a charge from capacitor CH to an output lead STC and to a discharge resistor RM. This produces an output impulse. The circuit continues to impulse so long as the output of amplifier IA5 is large enough to operate relay S through the blocking circuit DZ. In addition, a positive or negative voltage is applied continuously to a second output lead SG, a positive voltage being used to step the counter UDC FIG. 4 in an adding direction from the said impulses on STC, whilst a negative voltage causes the counter to step in a subtracting direction.

The counter has a twofold action. Thus it feeds signals to an encoder similar to the decoder shown in FIG. 3, but reversed; the output of this encoder switches one output from the phase divider PD, to an output lead, and also alters the amount of phase shift provided by the phase shifter CP, the action continuing until the difference in phase between CV and IP has been reduced to a minimum as determined by the discriminator PD. The impulsing action then stops. In the meantime the output of the encoder is also fed to a temporary store, of known type TS, and the resultant digital word in the store can be transferred via a recorder RR to a tape TO should this be required. Alternatively the temporary store word may be read into a transmission line, or otherwise employed.

It will thus be seen that devices have been provided for converting a digital word or signal into a required output phase voltage with respect to a standard phase. In addition, the reverse has been described, i.e. the provision of a digital signal which has been encoded to represent the phase of an input signal with reference to a standard.

It should be noticed that the number of switching points in the decoder and encoder and the capacity phase shifter, although shown as 12 and 4 respectively, can of course be varied to suit other systems such as a decimal base system, and the input and output from the circuits concerned can be obtained from or recorded on not only a tape but punched cards or like information means.

I claim:

1. A converter deriving an output alternating voltage differing in phase from an alternating reference voltage by an amount determined by an input digital signal, comprising digital input means, a pickup for said input means, a temporary signal store, a distributor adapted to distribute the digits of said signal over a plurality of units in said temporary store, a decoding matrix connected to some of the store units and adapted to select and energize one of a plurality of leads, a stepped phase divider connected to said decoding matrix via said leads and also to a source of said alternating reference voltage, the connections whereof are such that a lead energized by said decoding matrix selects a particular associated step of said phase divider, an output lead from said phase divider which carries the divided phase voltage, and a stepped phase shifting network connected to other units of said store and connected to said phase divider output lead, the shift of said phase shifting network being determined by the information in said other units.

2. A converter as recited in claim 1, wherein said phase divider comprises three input leads a stabilized 3-phase supply connected to said leads three potentiometers each connected from the lead of one phase to the lead of the next phase, tappings from each potentiometer, a tapping from each phase lead, and a switch connected between each tapping point and a common output lead, whereby only one tapping can be connected at any one time to said output lead.

3. A converter as recited in claim 1 wherein said phase shifting network comprises a resistor in said output lead from said phase divider and a plurality of capacitors having capacitance values in the ratio 1—2—4—, means for switching any desired combination of said capacitors across said resistor, said means being under control of said temporary store, and an output lead connected to said resistor and to one of the terminals of each of said capacitors.

4. A distributor as recited in claim 1 wherein said temporary store consists of a plurality of two-state devices, and connections between the outputs of said devices and said decoding matrix.

5. A converter as recited in claim 4 wherein said distributor is adapted to receive a binary code and therefrom to set and reset said two-state devices of said decoding matrix.

6. A converter as recited in claim 1 wherein said decoding matrix comprises a plurality of input leads, a plurality of output leads greater than the number of input leads, and a binary arrangement of switching devices interconnecting said input and output leads.

7. A phase to digital signal converter comprising: a phase discriminator; a first input thereto for receiving a first voltage signal the relative phase of which is to be digitized; a second input thereto for receiving a phase-variable second voltage signal of the same frequency as said first voltage signal; said phase discriminator comprising means for squaring both signals, a differentiator for receiving and differentiating said second squared signal, a combining circuit for combining said first squared signal and said second differentiated signal, and an amplifier for receiving the output of said combining circuit and producing an output voltage signal proportional to the phase shift between said first squared and second differentiated signals; an impulse generator comprising an amplifier adapted to receive the output voltage of said amplifier in said phase discriminator, means for producing output impulses actuated by the output from said impulse generator amplifier when said output exceeds a predetermined voltage, a blocking circuit determining said predetermined voltage, and a second DC output from said impulse generator amplifier of a polarity corresponding to the relative phase of said first and second input voltage signals; a phase shifting circuit with an input from a fixed phase reference voltage source, the output of said phase shifting circuit being said second input to said phase discriminator; switching means for varying said phase shifting circuit under control of impulses from said impulse generator and said second DC output until said first and second input signals to said phase discriminator substantially coincide in phase; and means for translating the condition of said switching means into digital form.

8. A converter as defined in claim 7 wherein said phase shifting circuit comprises a tapped potentiometer network, a 3-phase stabilized reference supply connected to said tapped potentiometer, means for connecting one of said tappings to an output lead, and a variable resistor-capacitor network to which said output lead is connected.

9. A converter as defined in claim 8 wherein said switching means comprises an up-an-down counter of known type actuated by the outputs of said impulse generator and an encoder actuated by said counter, and output leads of said encoder connected to and determining the output phase of said phase shifting circuit.

10. A converter as defined in claim 7 comprising a temporary store, the output leads of said encoder being connected to and setting the units of said store, and means for transmitting the contents of said store to a desired channel.